US012810147B2

(12) United States Patent
Dong et al.

(10) Patent No.: US 12,810,147 B2
(45) Date of Patent: Nov. 24, 2026

(54) METHOD AND APPARATUS FOR INVERTING PARAMETERS OF VEGETATION LEAVES BASED ON REMOTE SENSING

(71) Applicant: AEROSPACE INFORMATION RESEARCH INSTITUTE, CHINESE ACADEMY OF SCIENCES, Beijing (CN)

(72) Inventors: Yingying Dong, Beijing (CN); Yunli Han, Beijing (CN); Yining Zhu, Beijing (CN); Xueling Li, Beijing (CN)

(73) Assignee: AEROSPACE INFORMATION RESEARCH INSTITUTE, CHINESE ACADEMY OF SCIENCES, Beijing (CN)

( * ) Notice: Subject to any disclaimer, the term of this patent is extended or adjusted under 35 U.S.C. 154(b) by 932 days.

(21) Appl. No.: 17/948,362

(22) Filed: Sep. 20, 2022

(65) Prior Publication Data

US 2023/0351173 A1 Nov. 2, 2023

(30) Foreign Application Priority Data

Apr. 27, 2022 (CN) ........................ 202210451977.X

(51) Int. Cl.

| | |
|---|---|
| ***G06N 3/08*** | (2023.01) |
| ***G06N 3/04*** | (2023.01) |
| ***G06N 3/063*** | (2023.01) |
| ***G06N 3/09*** | (2023.01) |
| ***G06V 20/10*** | (2022.01) |

(52) U.S. Cl.

CPC ................. *G06N 3/08* (2013.01); *G06N 3/04* (2013.01); *G06N 3/063* (2013.01); *G06N 3/09* (2023.01); *G06V 20/188* (2022.01)

(58) Field of Classification Search

CPC ............ G06N 3/08; G06N 3/04; G06N 3/063; G06N 3/09; G06V 20/188

See application file for complete search history.

(56) References Cited

U.S. PATENT DOCUMENTS

| | | | | |
|---|---|---|---|---|
| 12,675,992 | B2 * | 7/2026 | Shao | G06V 20/188 |
| 2025/0252734 | A1 * | 8/2025 | Tian | G06V 20/182 |

OTHER PUBLICATIONS

Jacquemoud, Stéphane, et al. "Prospect+ SAIL models: A review of use for vegetation characterization." Remote sensing of environment 113 (2009): S56-S66. (Year: 2009).*

(Continued)

*Primary Examiner* — James T Tsai

(74) *Attorney, Agent, or Firm* — Boyle Fredrickson S.C.

(57) ABSTRACT

An apparatus for inverting parameters of vegetation leaves based on remote sensing is provided. The apparatus is obtained by performing inverse processes of a PROSAIL model based on a deep neural network, achieving strong physical mechanism and high accuracy. A method for inverting parameters of vegetation leaves based on remote sensing is provided. In the method, the apparatus for inverting parameters of vegetation leaves based on remote sensing is used, and the parameters of the vegetation leaves are obtained by performing inversion based on remote sensing data of the vegetation leaves, achieving high reliability and high accuracy.

8 Claims, 4 Drawing Sheets

(56) References Cited

OTHER PUBLICATIONS

De Sa, Nuno Cesar, et al. "Exploring the impact of noise on hybrid inversion of PROSAIL RTM on Sentinel-2 data." Remote Sensing 13.4 (2021): 648. (Year: 2021).*
Verhoef, Wouter. "Light scattering by leaf layers with application to canopy reflectance modeling: The SAIL model." Remote sensing of environment 16.2 (1984): 125-141. (Year: 1984).*
Taniguchi, Kenta, Kenta Obata, and Hiroki Yoshioka. "Derivation and approximation of soil isoline equations in the red-near-infrared reflectance subspace." Journal of Applied Remote Sensing 8.1 (2014): 083621-083621. (Year: 2014).*
Jacquemoud, S., & Baret, F. (1990). PROSPECT: A model of leaf optical properties spectra. Remote sensing of environment, 34(2), 75-91. (Year: 1990).*
Salam, A., El Hibaoui, A., & Saif, A. (2021). A comparison of activation functions in multilayer neural network for predicting the production and consumption of electricity power. International Journal of Electrical and Computer Engineering, 11(1), 163. (Year: 2021).*
Chen, L., Ren, C., Zhang, B., Wang, Z., & Xi, Y. (2018). Estimation of forest above-ground biomass by geographically weighted regression and machine learning with sentinel imagery. Forests, 9(10), 582. (Year: 2018).*

* cited by examiner

METHOD AND APPARATUS FOR INVERTING PARAMETERS OF VEGETATION LEAVES BASED ON REMOTE SENSING

CROSS-REFERENCE TO RELATED APPLICATIONS

The present application claims priority to Chinese Patent Application No. 202210451977.X, titled "METHOD AND APPARATUS FOR INVERTING PARAMETERS OF VEGETATION LEAVES BASED ON REMOTE SENSING", filed on Apr. 27, 2022 with the Chinese Patent Office, which is incorporated herein by reference in its entirety.

TECHNICAL FIELD

The present disclosure relates to the field of remote sensing technology, and in particular relates to a method and an apparatus for inverting parameters of vegetation leaves based on remote sensing.

BACKGROUND OF THE INVENTION

Parameters of leaves are important indicators for indicating the growth state of vegetation. Quantitatively obtaining parameters of leaves is an important field in precision agriculture research, and is of great significance for supporting research such as carbon cycle.

At present, remote sensing based on deep learning is widely used, and especially is used in nonlinear parameter inversion. For a deep neural network model, an intrinsic relationship between input parameters and output parameters of the model may be determined by performing continuous learning and training, thereby realizing parameter inversion.

However, the accuracy of the conventional method for inverting parameters of vegetation leaves based on deep learning is required to be improved.

SUMMARY OF THE INVENTION

A method and an apparatus for inverting parameters of vegetation leaves based on remote sensing are provided according to the present disclosure to improve the accuracy of the method for inverting parameters of vegetation leaves based on deep learning.

In order to achieve the above purpose, the following solutions are provided.

An apparatus for inverting parameters of vegetation leaves based on remote sensing is provided according to the present disclosure. The apparatus includes: an input module, a SAIL-Net sub-network, a PROSPECT-Net sub-network and an output module. The input module is configured to input remote sensing data of the vegetation leaves to the SAIL-Net sub-network. The SAIL-Net sub-network is configured to obtain a reflectivity and a transmittance of the vegetation leaves based on the remote sensing data and output the reflectivity and the transmittance of the vegetation leaves. The PROSPECT-Net sub-network is configured to obtain parameters of the vegetation leaves based on the reflectivity and the transmittance. The output module is configured to output the parameters of the vegetation leaves.

In an embodiment, the SAIL-Net sub-network includes: a first module, a second module, a third module, a fourth module, a fifth module, a sixth module, and a seventh module. The first module is configured to perform an inverse process of an SAIL model for solving the reflectivity based on the remote sensing data. The second module is configured to perform an inverse process of the SAIL model for solving a bidirectional reflection parameter $r_{so}$ and a directional reflection parameter $r_{do}$ of a diffuse reflection. The third module is configured to perform an inverse process of the SAIL model for solving a first coefficient. The fourth module is configured to perform an inverse process of the SAIL model for solving an extinction coefficient and a scattering coefficient. The fifth module is configured to perform an inverse process of the SAIL model for solving a singular point. The sixth module is configured to perform an inverse process of the SAIL model for solving a hot spot. The seventh module is configured to perform an inverse process of the SAIL model for solving the reflectivity and the transmittance of the vegetation leaves.

In an embodiment, the first module includes a convolution layer and a ReLU layer, the second module includes a transposed convolution layer and a ReLU layer, the third module includes a convolution layer and a ReLU layer, the fourth module includes a convolution layer and a ReLU layer, the fifth module includes a convolution layer and a ReLU layer, the sixth module includes a convolution layer and a ReLU layer, and the seventh module includes a maximum pooling layer, a convolution layer, and a ReLU layer.

In an embodiment, data outputted from the first module is inputted to the second module, data outputted from the second module is inputted to the third module and the fifth module, and data outputted from the third module is inputted to the fourth module and the sixth module.

In an embodiment, the SAIL-Net sub-network further includes: a splicing module. The splicing module is configured to splice data outputted from the fourth module, data outputted from the fifth module and data outputted from the sixth module, and input spliced data to the seventh module.

In an embodiment, the PROSPECT-Net sub-network includes: an eighth module, a ninth module, a tenth module, and an eleventh module. The eighth module is configured to perform an inverse process of a PROSPECT model for solving a transmittance and a refractive index of the vegetation leaves in a case of $N\neq1$. The ninth module is configured to perform an inverse process of the PROSPECT model for solving a transmittance $\rho_\alpha$ and a refractive index $\tau_\alpha$ of the vegetation leaves in a case of $N=1$. The tenth module is configured to perform an inverse process of the PROSPECT model for solving a transmission coefficient $\theta$. The eleventh module is configured to perform an inverse process of the PROSPECT model for solving parameters N, $C_m$, $C_w$ and $C_{ab}$ of the vegetation leaves.

In an embodiment, each of the eighth module, the ninth module, the tenth module and the eleventh module includes a fully connected layer and a LeakReLU layer.

In an embodiment, the SAIL-Net sub-network and the PROSPECT-Net sub-network form a PROSAIL-Net network, and the PROSAIL-Net network is trained by performing forward propagation and back propagation.

A method for inverting parameters of vegetation leaves based on remote sensing is provided according to the present disclosure. The method includes: obtaining remote sensing data of the vegetation leaves; and obtaining inversion parameters of the vegetation leaves based on a PROSAIL-Net network and the remote sensing data, where the PROSAIL-Net network includes the SAIL-Net sub-network and the PROSPECT-Net sub-network according to the embodiments of the present disclosure.

An electronic device is provided according to the present disclosure. The electronic device includes a memory and a processor. The memory stores a program. The processor is configured to execute the program to perform the method for inverting parameters of vegetation leaves based on remote sensing.

A readable storage medium is provided according to the present disclosure. The readable storage medium stores a computer program. The computer program, when executed by a processor, causes the processor to perform the method for inverting parameters of vegetation leaves based on remote sensing.

The apparatus for inverting parameters of vegetation leaves based on remote sensing according to the present disclosure is obtained by performing inverse processes of a PROSAIL model based on a deep neural network, achieving strong physical mechanism and high accuracy. In the method for inverting parameters of vegetation leaves based on remote sensing according to the present disclosure, the apparatus for inverting parameters of vegetation leaves based on remote sensing according to the present disclosure is used, and the parameters of the vegetation leaves are obtained by performing inversion based on remote sensing data of the vegetation leaves, achieving high reliability and high accuracy.

BRIEF DESCRIPTION OF THE DRAWINGS

For more clearly illustrating technical solutions in the embodiments of the present disclosure or the conventional technology, the drawings to be used in the description of the embodiments or the conventional technology are introduced simply hereinafter. Apparently, the drawings in the following description show only some examples of the present disclosure. For those skilled in the art, other drawings may be obtained based on the provided drawings without any creative efforts.

DETAILED DESCRIPTION OF THE EMBODIMENTS

Figure 1:
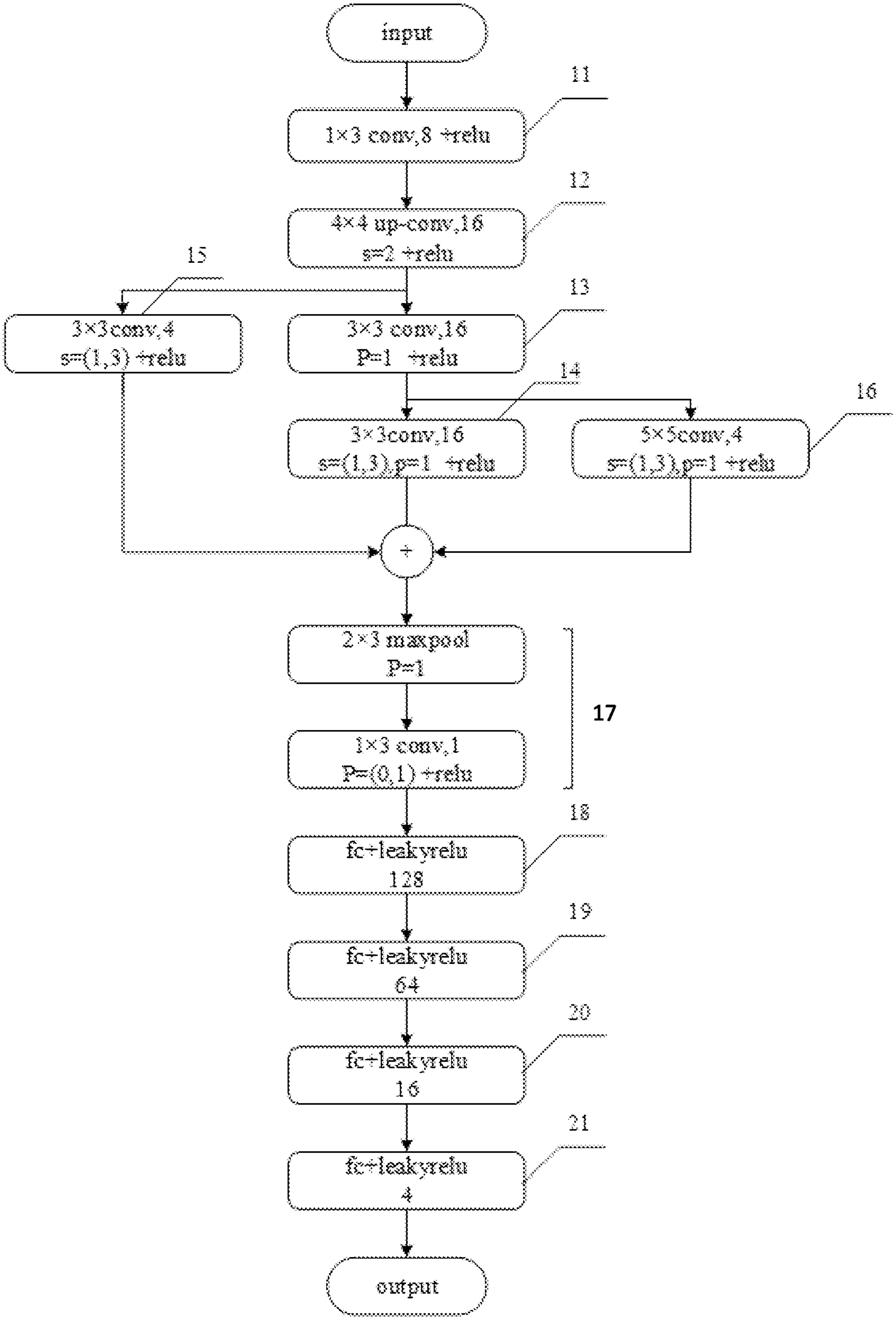
FIG. 1 is a schematic structural diagram of a PROSAIL-Net network according to an embodiment of the present disclosure.

Technical solutions in the embodiments of the present disclosure are clearly and completely described hereinafter in conjunction with the drawings in the embodiments of the present disclosure. Apparently, the embodiments described in the following are only some embodiments of the present disclosure, rather than all embodiments. All other embodiments obtained by those skilled in the art based on the embodiments of the present disclosure without any creative work fall within the protection scope of the present disclosure.

With a deep neural network, an intrinsic relationship between inputs and outputs may be determined by performing learning and training based on obtained sample data.

In the research, it is found that the following problems exist in inverting parameters of vegetation leaves with the deep neural network. Since the deep neural network (that is, a "black box") lacks physical mechanisms and has poor interpretability, it is difficult to improve the accuracy of the inversion result for the parameters of leaves by using the deep neural network.

In order to solve the above problems, in the method for inverting parameters of vegetation leaves based on remote sensing according to the embodiments of the present disclosure, a deep neural network is constructed based on the physical mechanism of inverting parameters of leaves, so that the deep neural network has a structure that conforms to the physical logic of inverting the parameters of the leaves, and the inversion results obtained by the deep neural network are interpretable and have high accuracy.

Hereinafter, the process of constructing a deep neural network based on the physical mechanism of inverting parameters of leaves is described in detail.

The parameters of the vegetation leaves are mapped to a spectrum of the vegetation leaves by using a PROSAIL model. The PROSAIL model is a model coupling a leaf optical feature model PROSPECT and a canopy bidirectional reflectivity model SAIL.

With the PROSPECT model, a reflectivity and a transmittance of the vegetation leaves at a wavelength ranging from 400 nm to 2500 nm are simulated. Simplified equations of the PROSPECT model are expressed as follows:

$$R_{N,\alpha}=xR_{N,90}+y$$

$$T_{N,\alpha}=xT_{N,90}$$

$$x=t_{\alpha v}(\alpha,n)/t_{\alpha v}(90,n)$$

$$y=x(t_{\alpha v}(90,n)-1)+1-t_{\alpha v}(\alpha,n) \tag{1}$$

where α represents a maximum incident angle of a solid angle, n represents a refractive index, and $t_{\alpha v}$ (α,n) represents a transmittance of a dielectric plane surface.

The PROSPECT model may be divided into three modules based on physical and mathematical processes of the PROSPECT model. With a first module, a transmission coefficient θ is solved. With a second module, a transmittance $\rho_\alpha$ and a refractive index $\tau_\alpha$ of the vegetation leaves in a case of N=1 are solved. With a third module, a transmittance $R_{N,\alpha}$ and a refractive index $T_{N,\alpha}$ of the vegetation leaves in a case of N≠1 are solved.

A SAIL model solves scattering and absorption of four radiation fluxes $E^+$, $E^-$, $E_s$ and $E_o$ to simulate a bidirectional reflectivity of a turbid medium vegetation canopy. The SAIL model solves $E^+$, $E^-$, $E_s$ and $E_o$ by using the following differential equations:

$$\frac{dE_s}{Ldx}=kE_s \tag{2}$$

$$\frac{dE^-}{Ldx}=-s'E_s+aE^--\sigma E^+$$

$$\frac{dE^+}{Ldx}=-sE_s+\sigma E^--aE^+$$

$$\frac{dE_o}{Ldx}=wE_s+vE^-+v'E^+-KE_o$$

where $E_s$ represents a flux density of a direct radiation transmitted from top to bottom, L represents an area index LAI of the leaves, k represents an extinction coefficient in a direction of the sun, $E^-$ represents a downward diffusion irradiance, s' represents a scattering coefficient in a direction facing away from the direct radiation, a represents an extinction coefficient, σ represents a back scattering coefficient, $E^+$ represents an upward diffusion irradiance, s represents a scattering coefficient in a same direction of the direct radiation, $E_o$ represents a flux density in an observation direction, w represents an upward bidirectional scattering coefficient, v represents a back scattering coefficient in a direction of a scattered incident, v' represents a forward scattering coefficient in a direction of the scattered incident, K represents an extinction coefficient in the observation direction, and x represents a relative optical height, ranging from −1 to 0 (from the bottom to the top).

The process of solving the equations (2) may include six steps.

In a first step, the following extinction coefficients and scattering coefficients k, s', a, σ, w, v, v' and K are solved. In solving differential equations, a singular point may occur, resulting in numerical errors. Thus, in a second step, the singular point is solved. To avoid the hot spot effect, a hot spot is solved in a third step. In a fourth step, the parameters such as $\rho_{so}$ and $\tau_{sd}$ are solved, which are functions of LAI, the extinction coefficient and the scattering coefficient. $\rho_{so}$ represents a bidirectional reflectivity of one layer, and $\tau_{sd}$ represents a transmittance of diffuse reflection of specular incidence. Since some parameters are affected by the singular point, in a fifth step, $r_{so}$ and $r_{do}$ are solved, where $r_{so}$ represents the influence of the hot spot, $r_{so}$ represents a bidirectional reflection parameter, and $r_{do}$ represents a directional reflection parameter of the diffuse reflection. In a sixth step, a reflectivity R is solved.

Based on the function of the PROSAIL model, it can be seen that the process of inverting parameters of vegetation leaves is an inverse process of the PROSAIL model. However, since the inverse processes of the PROSPECT model and the SAIL model cannot be parsed, a deep neural network is used to replace the inverse processes of the PROSPECT model and the SAIL model in the embodiments of the present disclosure.

For the simulation of the deep neural network PROSAIL-Net based on the inverse process of the PROSAIL model, a 1*244 spectrum is inputted to a network performing the inverse process of the SAIL model to obtain the reflectivity and the transmittance of the leaves, and then the reflectivity and the transmittance of the leaves are inputted to a network performing the inverse process of the PROSPECT model to obtain inversion values of the parameters of the leaves.

The network performing the inverse process of the SAIL model and the design for performing the PROSPECT model are respectively described hereinafter.

Inverse modules of the SAIL model, that is, the network performing the inverse process of the SAIL model, perform inverse processes of the six functions of the SAIL model.

1. A first module performs an inverse process of solving the reflectivity R by the SAIL model.

The reflectivity equation is expressed as follows:

$$R = \frac{E_o}{E_{sun} + E_{sky}} = r_{so}(1 - SKYL) + r_{do}SKYL \tag{3}$$

where $E_o$ represents the flux density in the observation direction, $E_{sun}$ represents a solar irradiance on the ground, $E_{sky}$ represents a sky irradiance on the ground, SKYL represents a proportion of diffusely scattered sky light in the solar incidence (a known value), $r_{so}$ represents the bidirectional reflectivity, and $r_{do}$ represents a directional reflectivity of diffuse scattering at incident.

It should be understood that in the inverse process performed by the first module based on equations (3), the remote sensing data of the vegetation leaves includes the reflectivity, and the bidirectional reflectivity and the directional reflectivity of the diffuse scattering at incident are obtained based on the known SKYL.

Based on functions of a convolution layer and a ReLU layer and due to that the inverse process of the reflectivity module is a nonlinear process, by using the equation (3), the convolution layer may be configured to extract a feature image of a spectrum, and the ReLU layer may be configured to expresses nonlinearity. Therefore, the first module is expressed by a convolution and a ReLU function in this step. In order to fully express each of the spectrums, the convolution size should not be set too large. In some implementations, the convolution size is set to 1*3, and the number is set to 8. The first module is denoted by 11 in FIG. 1.

The first module extracts main features of the spectrums. Since the convolution has features of incomplete connection and "parameter sharing", network parameters are greatly reduced to ensure the sparsity of the network and avoid overfitting, and eight 1*242 spectra features are obtained.

2. A second module performs an inverse process of solving $r_{so}$ and $r_{do}$ by the SAIL model.

The SAIL model solves the bidirectional reflection parameter $r_{so}$ and the directional reflection parameter $r_{do}$ of the diffuse reflection (that is, the forward process) based on the following equations:

$$r_{so} = \rho_{so} + \left[\tau_{ssoo} + \frac{(\tau_{sd} + \tau_{ss} r_s \rho_{dd})\tau_{oo} + (\tau_{ss} + \tau_{sd})\tau_{do}}{1 - r_s \rho_{dd}}\right] r_s \tag{4}$$

$$r_{do} = \rho_{do} + \frac{\tau_{dd} r_s (\tau_{oo} + \tau_{do})}{1 - r_s \rho_{dd}}$$

where $\rho_{so}$ represents the bidirectional reflectivity of one layer, $\rho_{sd}$ represents a diffuse reflection of a specular incidence of one layer, $\rho_{do}$ represents a directional reflectivity of the diffuse reflection of one layer, $\rho_{dd}$ represents a diffuse reflectivity of one layer, $\tau_{sd}$ represents a transmittance of diffuse reflection of the specular incidence, $\tau_{ssoo}$ represents a bidirectional direct transmittance, $\tau_{ss}$ represents a direct transmittance in a direction of the sun, $\tau_{oo}$ represents the direct transmittance in the observation direction, $\tau_{do}$ represents a directional transmittance of the diffuse incidence, $r_{so}$ represents the bidirectional reflection, and $r_{do}$ represents a directional reflection of the diffuse reflection.

Based on the bidirectional reflection parameters $r_{so}$ and the directional reflection parameters $r_{do}$ of the diffuse reflection obtained by the first module, the second module obtains the parameters on the right side of the equal sign in equations (4). For the convenience of description, the parameters on the right side of the equal sign in equations (4) are referred to as first coefficients.

The second module is expressed by a deconvolution (that is, a transposed convolution) and a ReLU function. The second module includes a transposed convolution layer and a ReLU layer. The transposed convolution layer is configured with even convolution size. In order to avoid the case of checkerboard, the convolution size is set to 4*4, the step is set to 2, and the number is set to 16. With the second module, sizes of the spectral features are expanded, and especially widths of the spectral features are expanded, for facilitating subsequent processing. Sixteen 4*486 spectral features are obtained. The second module is denoted by 12 in FIG. 1.

3. A third module performs an inverse process of solving equation coefficients such as $\rho_{so}$ $\rho_{sd}$, $\rho_{do}$, $\rho_{dd}$, $\tau_{sd}$, $\tau_{ssoo}$, $\tau_{ss}$, $\tau_{oo}$ and $\tau_{do}$ by the SAIL model. The equation coefficients are obtained by the second module, and the third module obtains second coefficients based on the first coefficients.

Since it is required for the third module to solve many equations having strong nonlinearity, the third module is expressed by a convolution and a ReLU function. That is, the third module includes a convolution layer and a ReLU layer. The convolution size is set to 3*3, the padding is set to 1, and the number is set to 16. The third module extracts spectral features. With the padding, the input and the output have the same height and width, increasing the usage of information of edge features and fully increasing the receptive field. Sixteen 4*486 spectra features are obtained. The third module is denoted by 13 in FIG. 1.

4. A fourth module performs an inverse process of solving coefficients κ, s', a, σ, w, v, v' and K by the SAIL model. The fourth module includes a convolution layer and a ReLU layer. The size of the convolution kernel is 3*3, the padding is 1, and the step size is (1, 3). With the fourth module, spectral features are further extracted, reducing the size and preparing for subsequent splicing processing. Four 2*162 spectral features are obtained. The fourth module is denoted by 14 in FIG. 1.

5. A fifth module performs an inverse process of solving a singular point by the SAIL model. The fifth module includes a convolution layer and a ReLU layer. The convolution size is 3*3, the step size is (1, 3), and the number is 4. With the fifth module, spectral features are extracted. Four 2*162 spectral features are obtained. The fifth module is denoted by 15 in FIG. 1. The output of 12 is inputted to 15, and the output of 12 is inputted to 13.

6. A sixth module performs an inverse process of solving a hot spot by the SAIL model. The sixth module includes a convolution layer and a RELU layer. The convolution size is 5*5, the step size is (1, 3), and the number is 4. With the sixth module, spectral features are extracted. With the 5*5 convolution, the receptive field is increased. Four 2*162 spectral features are obtained. The sixth module is denoted by 16 in FIG. 1. The output of 13 is inputted to 16, and the output of 13 is inputted to 14.

7. A seventh module performs an inverse process of solving the reflectivity and the transmittance of the leaves by the SAIL model. The seventh module includes a maximum pooling layer, a convolution layer, and a ReLU function to express the inverse process. The maximum pooling size is 2*2, and the padding is 1. With the seventh module, the most important features are extracted and the dimensions of the spectrums are reduced. The convolution size is 1*3, the padding is 1, and the number is 1. The number of channels and the widths are kept unchanged. A 2*244 spectral feature, that is the reflectivity and the transmittance of the leaves, is obtained. The network constructed by this step is denoted by 17 in FIG. 1. The input of 17 is a spliced feature of features outputted by 14, 15 and 16.

It should be noted that the SAIL model actually has more than two input parameters of the reflectivity and the transmittance of the leaves, thus it is required to select parameters, so the seventh step is performed.

In a first step of an inverse process of the PROSPECT model, an inverse process of solving a transmittance $R_{N,a}$ and a refractive index $T_{N,a}$ of the leaves in a case of N≠1 is performed. The forward process is performed based on the following equations:

$$R_{N,\alpha} = \rho_\alpha + \frac{\tau_\alpha \tau_{90} R_{N-1,90}}{1-\rho_{90} R_{N-1,90}} \tag{5}$$

$$T_{N,\alpha} = \frac{\tau_\alpha T_{N-1,90}}{1-\rho_{90} R_{N-1,90}} \tag{6}$$

That is, a first module (that is, an eighth module in the above order) of the PROSPECT-Net sub-network includes a fully connected layer and a LeakReLU layer. There are 128 LeakReLU nodes. With the LeakReLU activation function, a nonlinear structure is achieved. Due to the deep network structure, the LeakReLU activation function is used to avoid the disappearance of gradients.

In a second step of the inverse process of the PROSPECT model, an inverse process of solving a transmittance $\rho_\alpha$ and a refractive index $\tau_\alpha$ of the leaves in a case of N=1 is performed. The forward process is performed based on the following equations:

$$\rho_\alpha = [1 - t_{av}(\alpha, n)] + \frac{t_{av}(90, n) t_{av}(\alpha, n) \theta^2 [n^2 - t_{av}(90, n)]}{n^4 - \theta^2 [n^2 - t_{av}(90, n)]^2} \tag{7}$$

$$\tau_\alpha = \frac{t_{av}(90, n) t_{av}(\alpha, n) \theta^2 n^2}{n^4 - \theta^2 [n^2 - t_{av}(90, n)]^2} \tag{8}$$

That is, a second module (that is, a ninth module in the above order) of the PROSPECT-Net sub-network includes a fully connected layer and a LeakReLU layer. There are 64 LeakReLU nodes.

In a third step of the inverse process of the PROSPECT model, a transmission coefficient θ is solved. The forward process is performed based on the following equations:

$$\theta = (1-k)e^{-k} + k^2 \int_k^\infty N^{-1} e^{-k} dx \tag{9}$$

$$k(\lambda) = \sum K_i(\lambda) C_i \tag{10}$$

where λ represents a wavelength, $K_i(\lambda)$ represents a spectral specific absorption coefficient relative to a biochemical parameter i of the leaves, and $C_i$ represents a content of the biochemical parameter i of the leaves per unit leaf area.

That is, a third module (that is, a tenth module in the above order) of the PROSPECT-Net sub-network includes a fully connected layer and a LeakReLU layer. There are 16 nodes.

In a fourth step of the inverse process of the PROSPECT model, an inverse process of solving parameters N, $C_m$, $C_w$, and $C_{ab}$ of the leaves. That is, a fourth module (that is, an eleventh module in the above order) of the PROSPECT-Net sub-network includes a fully connected layer and a LeakReLU layer.

The modules of the PROSPECT-Net sub-network are respectively donated by 18, 19, 20, and 21 in FIG. 1. The output module "output" in FIG. 1 outputs four parameters of the leaves.

In summary, a deep neural network PROSAIL-Net shown in FIG. 1 is obtained by expressing the inverse processes of the PROSAIL model using the deep neural network.

Based on functions, the deep neural network PROSAIL-Net shown in FIG. 1 is divided into two sub-networks: a SAIL-Net sub-network and a PROSPECT-Net sub-network.

In the research, it is found that the SAIL-Net sub-network shown in FIG. 1 may invert the reflectivity and the transmittance of the leaves with high precision, and the PROSPECT-Net sub-network may invert the parameters of the leaves with high precision.

Hereinafter, the above conclusions are proved.

The PROSAIL model simulates 50,000 pieces of data, and the spectral reflectivity, the reflectivity of the leaves, the transmittance of the leaf, and the parameters N, $C_{ab}$, $C_w$, and $C_m$ of the leaves are saved. The data are grouped into a training set, a validation set and a test set respectively according to proportions of 60%, 20% and 20%. Samples in the training set and samples in the validation set samples are inputted to the SAIL-Net network and the PROSPECT-Net network for training the two networks, and then samples in the test set are inputted to the trained SAIL-Net network and the trained PROSPECT-Net network. Finally, network inversion values are obtained, and a $R^2$ and a root mean square error RAISE of the network inversion values relative to corresponding true values are calculated.

Figure 2:
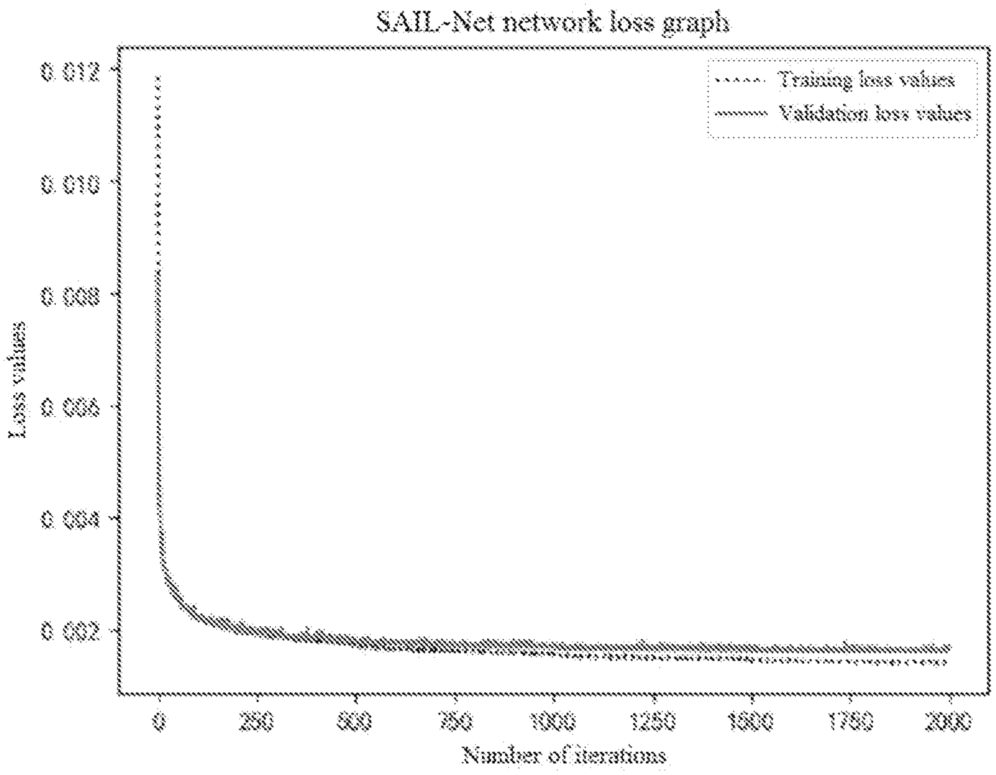
FIG. 2 is a schematic diagram showing a relationship, based on a training set and a validation set, between loss functions and the number of iterations of a SAIL-Net sub-network in a PROSAIL-Net network.

In training the SAIL-Net sub-network, it is found that as shown in FIG. 2, the accuracy of the loss function of the training set and the accuracy of the loss function of the validation set reach $10^{-3}$, and gradually decrease and converge. Therefore, the SAIL-Net sub-network is stable. With the trained SAIL-Net sub-network, inversion is performed to obtain the reflectivity and the transmittance of the leaves. It is calculated that $R^2$ of the reflectivity of the leaves is 0.9489, the RAISE of the reflectivity of the leaves is 0.0380, $R^2$ of the transmittance of the leaves is 0.9473, and the RAISE of the transmittance of the leaves is 0.0387. It can be seen that the SAIL-Net network can invert the reflectivity and the transmittance of the leaves with high precision, so the SAIL-Net sub-network is designed reasonably.

Figure 3:
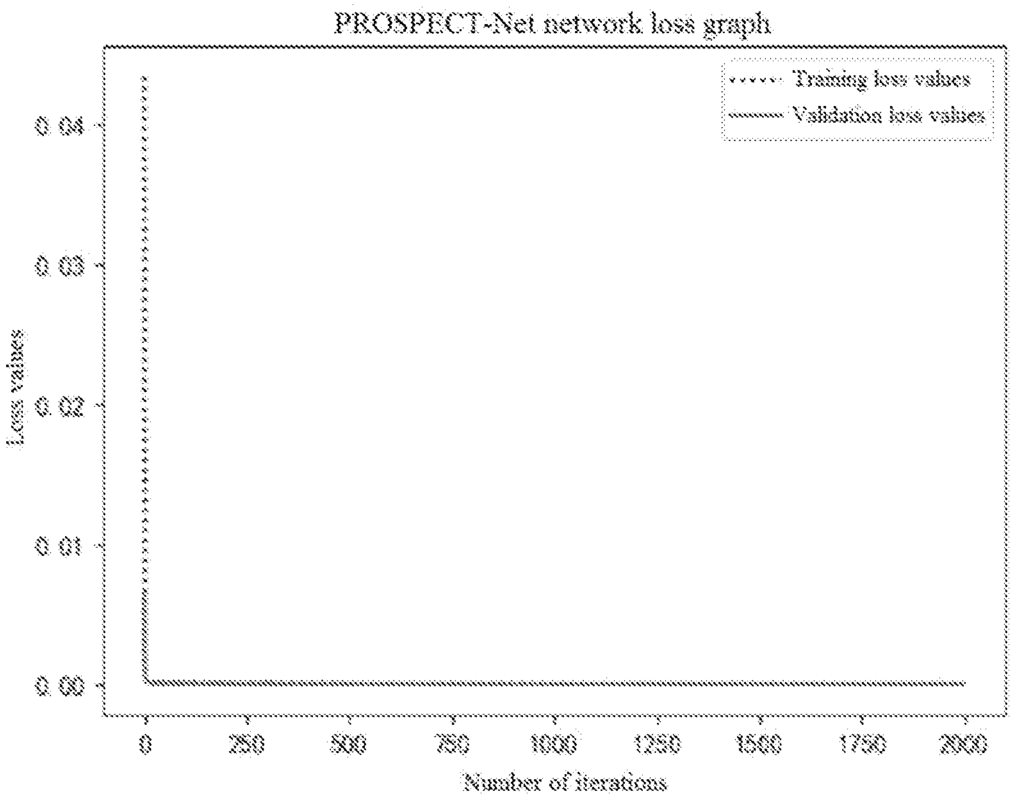
FIG. 3 is a schematic diagram showing a relationship, based on a training set and a validation set, between loss functions and the number of iterations of a PROSPECT-Net sub-network in a PROSAIL-Net network.

In training the PROSPECT-Net sub-network, it is found that as shown in FIG. 3, the accuracy of the loss function of the training set and the accuracy of the loss function of the validation set reaches $10^{-7}$, and gradually decrease and converge. With the trained PROSPECT-Net sub-network, inversion is performed to obtain the parameters $C_{ab}$, N, $C_m$ and $C_w$ of the leaves. $R^2$ of each of the parameters reaches 0.99, and RMSEs of the parameters respectively are 0.053, $9.3*10^{-4}$, $3*10^{-5}$, and $2*10^{-5}$. It can be seen that the PROSPECT-Net network can invert four parameters of the leaves with high precision, so the PROSPECT-Net sub-network is designed reasonably.

The training process is a process of minimizing the loss function by performing forward propagation and back propagation. Since the inversion of the parameters of the leaves is a regression problem, a mean square error loss function is used to estimate the error as shown in the following equation (11). The method is a gradient descent method. With the method, parameters are continuously updated through the forward and inverse processes, so that the loss function reaches a global minimum value.

$$MSE(y, y') = \frac{1}{n}\sum_{i=1}^{n}(y_i - y_i')^2 \tag{11}$$

In the above equation (11), $y_i$ represents an i-th label value of a parameter of the leaves; $y_i'$ represents a network predicted value of the parameter of the leaves; and n represents the number of solutions of the parameter of the leaves, which is equal to 4 in this example.

Before performing the training process, the data is firstly preprocessed, and an amount of samples are randomly selected from the overall samples as training samples, validation samples and test samples. The three types of sample data are not repeated, and respectively have a proportion of 60%, 20% and 20%. The samples include the spectral reflectivity as input values and corresponding label values: N, $C_m$, $C_w$ and $C_{ab}$. The validation samples are used to adjust hyperparameters of the network, prevent, fit or make an initial evaluation of the model. In order to facilitate convergence, normalization operation is performed on the four parameters of the leaves.

Figure 4:
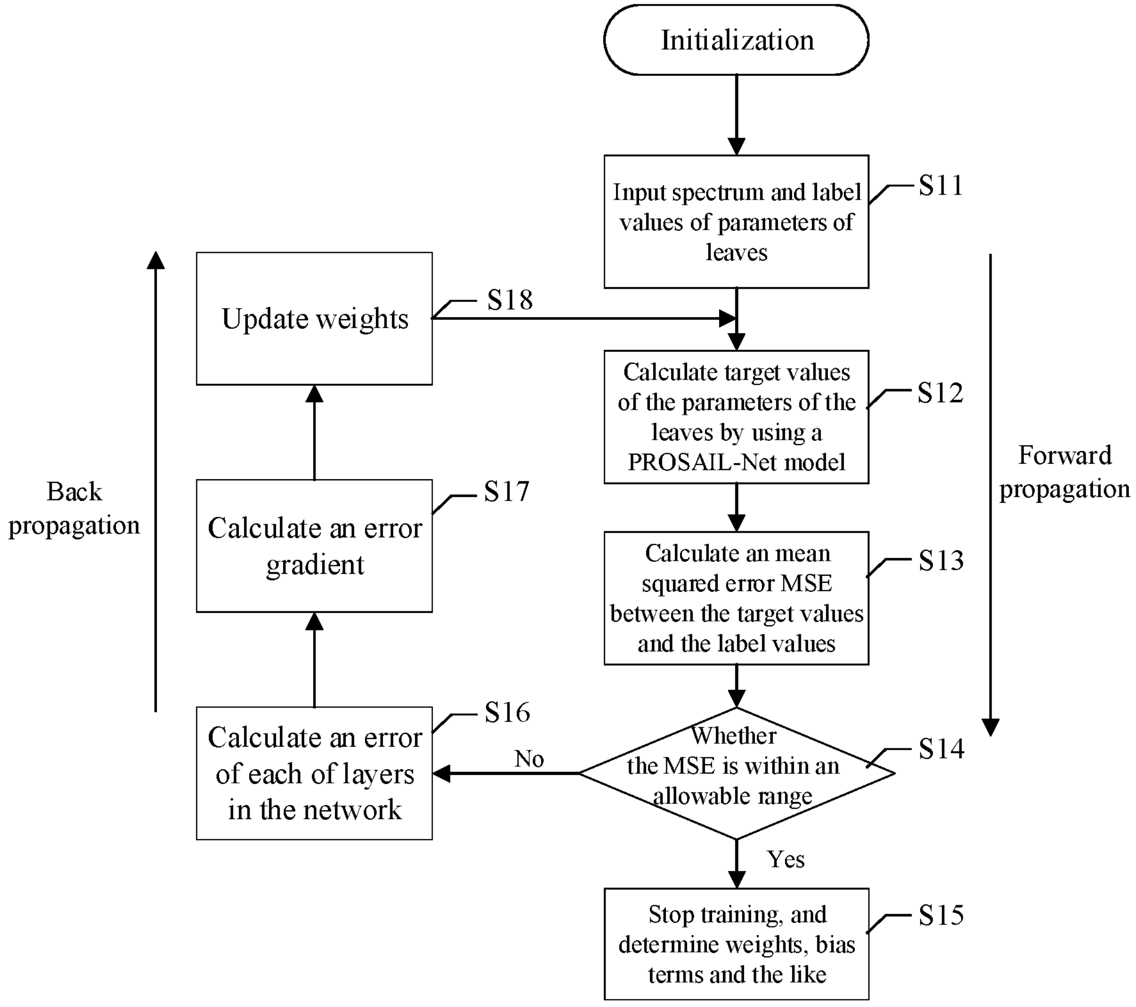
FIG. 4 is a flowchart of training a PROSAIL-Net network according to an embodiment of the present disclosure.

As shown in FIG. 4, the training process includes the following steps S11 to S15.

In step S11, after initializing weights of the PROSAIL-Net network, the training samples and the verification samples of the spectral reflectivities are inputted to the PROSAIL-Net network in batches. That is, the training samples and the validation samples are inputted to the PROSAIL-Net network.

In step S12, the parameters of the leaves are calculated by the PROSAIL-Net network. The values calculated by the PROSAIL-Net network are called as target values of the parameters of the leaves. Forward propagation is performed based on the following equation (12):

$$y=\sigma(xW+B) \tag{12}$$

where Y represents an outputted parameter of the leaves which is a four-dimensional vector, x represents the number of the inputted spectra, W represents a weight of the convolutional layer and the fully connected layer, b represents a bias term of the convolutional layer and the fully connected layer, and σ(x) represents an activation function.

In step S13, an error MSE between the target value and the label value is calculated by using an average loss function.

In step S14, it is determined whether the MSE is within an allowable range. In a case that the MSE is within the allowable range, proceed to step S15. In a case that the MSE is not within the allowable range, proceed to step S16.

In step S15, the training process is stopped, and the values of parameters such as the weights and the bias terms are determined.

At this point, the forward propagation process is completed.

The back propagation includes the following steps S16 to S18.

In step S16, an error of each of layers of the network is calculated.

In step S17, an error gradient is calculated based on the error of each of the layers.

In the embodiment, the error gradient is calculated by using an Aadm algorithm in which the parameters are determined as default values under a Pytorch framework. For the hyperparameters of the network, a data batch size batchsize is set to 100, the number of iterations epoch is set to 1000, and an initial learning rate lr is set to 0.001. Since a too large learning rate will cause the model to miss an optimal solution, a learning rate decay rate is set. In first 1000 iterations, lr=lr×0.6 every 100 iterations. After the first 1000 iterations, lr=lr×0.6 every 500 iterations. If lr<$10^{-6}$, lr stops decrementing. Since the data is inputted in batches, an mean of the mean squared error is used, as shown in equation (11).

In step S18, weights are updated based on the error gradient.

The weights are updated by using the following equations (13) and (14):

$$J(y, y') = \frac{1}{batchsize} \sum_{i=1}^{batchsize} MSE(y, y') \tag{13}$$

$$W = W - lr\frac{\partial J(W, b)}{\partial W} \tag{14}$$

$$\text{where } b = b - lr\frac{\partial J(W, b)}{\partial b} \tag{15}$$

A forward propagation and a back propagation are performed by performing the above steps. The network parameters, weights and bias items are updated by performing the forward propagation and the back propagation. Each time an update is performed through an iteration, one iteration is completed. The loss function is continuously reduced and finally converges through continuous iterations.

The trained PROSAIL-Net network may be used for inverting the parameters of the vegetation leaves. The remote sensing data of the vegetation leaves is inputted to the PROSAIL-Net network to obtain the parameters of the vegetation leaves outputted by the PROSAIL-Net network.

An electronic device is further provided according to an embodiment of the present disclosure. The electronic device includes: a memory and a processor. The memory stores a program. The processor is configured to execute the program to perform the method for inverting parameters of vegetation leaves based on remote sensing.

A readable storage medium is provided according to an embodiment of the present disclosure. The readable storage medium stores a computer program. The computer program, when executed by a processor, causes the processor to perform the method for inverting parameters of vegetation leaves based on remote sensing.

The device embodiments described above are merely illustrative. Units described as separate components may be or may not be physically separated. Components shown as units may be or may not be physical units, that is, the components may be located in one place or may be distributed in multiple networked units. A part or all of the modules may be selected according to actual requirements to implement the solutions of the embodiments. Those skilled in the art can understand and implement the present disclosure without any creative efforts.

In the present disclosure, terms of "include", "comprise" or any other variants are intended to be non-exclusive. Therefore, a process, method, article or device including a series of elements includes not only these elements but also other elements that are not enumerated, or also include elements inherent for the process, method, article or device. Unless expressively limited otherwise, the statement of "comprising (including) one . . . " does not exclude the case that other similar elements exist in the process, method, article or device.

Each of the embodiments in the present disclosure emphasizes the differences from other embodiments, and the same or similar parts among the embodiments can be referred to each other. The features described in the embodiments in the present disclosure may be replaced or combined with each other.

The above illustration of the disclosed embodiments enables those skilled in the art to implement or practice the present disclosure. Many changes to these embodiments are apparent for those skilled in the art, and general principles defined herein can be implemented in other embodiments without departing the spirit or scope of the present disclosure. Hence, the present disclosure is not limited to the embodiments disclosed herein, but is to conform to the widest scope consistent with principles and novel features disclosed herein.

What we claim is:

1. An apparatus for inverting parameters of vegetation leaves based on remote sensing, comprising:

an input layer, configured to input remote sensing data of the vegetation leaves to a SAIL-Net sub-network;

the SAIL-Net sub-network, configured to obtain a reflectivity and a transmittance of the vegetation leaves based on the remote sensing data and output the reflectivity and the transmittance of the vegetation leaves;

a PROSPECT-Net sub-network, configured to obtain parameters of the vegetation leaves based on the reflectivity and the transmittance; and an output layer, configured to output the parameters of the vegetation leaves, wherein the parameters of the vegetation leaves comprise a leaf structure parameter N, a dry matter parameter $C_m$, a leaf equivalent water content thickness parameter $C_w$ and a chlorophyll a+b concentration parameter $C_{ab}$ of the vegetation leaves, wherein the SAIL-Net sub-network and the PROSPECT-Net sub-network form a PROSAIL-Net network;

the PROSAIL-Net network is trained by performing forward propagation and back propagation; and the back propagation comprises: calculating an error of each of layers of the PROSAIL-Net network, calculating an error gradient based on the error of each of the layers, and updating weights based on the error gradient, and wherein the SAIL-Net sub-network comprises:

a first layer, comprising a first convolution layer and a first ReLU layer and configured to perform an inverse process of a SAIL model for solving the reflectivity based on the remote sensing data;

a second layer, comprising a transposed convolution layer and a second ReLU layer and configured to perform an inverse process of the SAIL model for solving a bidirectional reflection parameter $r_{so}$ and a directional reflection parameter $r_{do}$ of a diffuse reflection;

a third layer, comprising a second convolution layer and a third ReLU layer and configured to perform an inverse process of the SAIL model for solving a first coefficient;

a fourth layer, comprising a third convolution layer and a fourth ReLU layer and configured to perform an inverse process of the SAIL model for solving an extinction coefficient and a scattering coefficient;

a fifth layer, comprising a fourth convolution layer and a fifth ReLU layer and configured to perform an inverse process of the SAIL model for solving a singular point;

a sixth layer, comprising a fifth convolution layer and a sixth ReLU layer and configured to perform an inverse process of the SAIL model for solving a hot spot; and a seventh layer, comprising a maximum pooling layer, a sixth convolution layer, and a seventh ReLU layer and configured to perform an inverse process of the SAIL model for solving the reflectivity and the transmittance of the vegetation leaves.

2. The apparatus according to claim 1, wherein data outputted from the first layer is inputted to the second layer; data outputted from the second layer is inputted to the third layer and the fifth layer; and data outputted from the third layer is inputted to the fourth layer and the sixth layer.

3. The apparatus according to claim 2, wherein the SAIL-Net sub-network further comprises:

a splicing layer, configured to splice data outputted from the fourth layer, data outputted from the fifth layer and data outputted from the sixth layer, and input spliced data to the seventh layer.

4. The apparatus according to claim 1, wherein the PROSPECT-Net sub-network comprises:

an eighth layer, configured to perform an inverse process of a PROSPECT model for solving the transmittance and a refractive index of the vegetation leaves in a case of $N \neq 1$;

a ninth layer, configured to perform an inverse process of the PROSPECT model for solving the transmittance $\rho_\alpha$ and the refractive index $\tau_\alpha$ of the vegetation leaves in a case of $N=1$;

a tenth layer, configured to perform an inverse process of the PROSPECT model for solving a transmission coefficient $\theta$; and an eleventh layer, configured to perform an inverse process of the PROSPECT model for solving parameters N, $C_m$, $C_w$ and $C_{ab}$ of the vegetation leaves.

5. The apparatus according to claim 4, wherein each of the eighth layer, the ninth layer, the tenth layer and the eleventh layer comprises a fully connected layer and a LeakReLU layer.

6. A method for inverting parameters of vegetation leaves based on remote sensing, comprising:

obtaining remote sensing data of the vegetation leaves; and obtaining inversion parameters of the vegetation leaves based on the PROSA1L-Net network according to claim 1 and the remote sensing data.

7. An electronic device, comprising:

a memory, storing a program; and a processor, configured to execute the program to perform the method for inverting the parameters of the vegetation leaves based on remote sensing according to claim 6.

8. A readable storage medium storing a computer program, wherein the computer program, when executed by a processor, causes the processor to perform the method for inverting the parameters of the vegetation leaves based on remote sensing according to claim 6.

* * * * *